(12) United States Patent
Coffin

(10) Patent No.: US 11,623,481 B2
(45) Date of Patent: Apr. 11, 2023

(54) LINKED TREAD APPARATUS FOR IMPROVED PERFORMANCE ON LOOSE SURFACES

(71) Applicant: Jacqueline Coffin, Duncansville, PA (US)

(72) Inventor: Jacqueline Coffin, Duncansville, PA (US)

( * ) Notice: Subject to any disclaimer, the term of this patent is extended or adjusted under 35 U.S.C. 154(b) by 443 days.

(21) Appl. No.: 16/876,301

(22) Filed: May 18, 2020

(65) Prior Publication Data
US 2021/0354769 A1   Nov. 18, 2021

(51) Int. Cl.
*B60C 27/20*   (2006.01)
*B60C 27/06*   (2006.01)

(52) U.S. Cl.
CPC ............ *B60C 27/20* (2013.01); *B60C 27/068* (2013.01)

(58) Field of Classification Search
CPC ..... B60C 27/20; B60C 27/02; B60C 27/0261; B60C 27/04; B60C 27/06; B60C 27/061; B60C 27/062; B60C 27/068
See application file for complete search history.

(56) References Cited

U.S. PATENT DOCUMENTS

| | | | | |
|---|---|---|---|---|
| 1,106,842 A * | 8/1914 | Porteous | ................. | B60B 15/18 305/4 |
| 2,046,299 A * | 6/1936 | Armington | ............. | B60C 27/20 152/182 |
| 2,764,205 A * | 9/1956 | Armington | ............. | B60C 27/20 152/182 |
| 2,764,210 A * | 9/1956 | Armington | ............. | B60C 27/20 152/182 |
| 4,408,646 A * | 10/1983 | Forsyth | ................... | B60C 27/20 152/185.1 |
| 5,261,470 A * | 11/1993 | Genaw | .................... | B60C 27/02 152/216 |
| 11,241,908 B2 * | 2/2022 | Mansfield | ............... | B60C 27/16 |
| 2015/0210128 A1 * | 7/2015 | Kim | ...................... | B60C 27/003 152/225 R |

FOREIGN PATENT DOCUMENTS

JP           61115706 A  *  3/1986  ............. B60C 27/20

* cited by examiner

*Primary Examiner* — Jason R Bellinger
(74) *Attorney, Agent, or Firm* — Kenyon Jenckes

(57) ABSTRACT

A tread link assembly is provided for improving the performance of a wheel on loose surfaces. The tread assembly includes a plurality of linked plates forming a circuit around the outer circumference of the wheel. The linked plates include first and second linking structures and releasable fasteners for linking adjacent plates together. The together the plates create a tread surface that is wider than the axial width of the wheel.

11 Claims, 9 Drawing Sheets

LINKED TREAD APPARATUS FOR IMPROVED PERFORMANCE ON LOOSE SURFACES

BACKGROUND

The present invention relates to an apparatus that may be mounted to one or more wheels of a personal conveyance vehicle such as a baby stroller, a wheel chair, cart, or the like. The apparatus provides a wider tread surface to the wheel for improving the wheel's performance rolling over loose surfaces such as sand, snow or mud.

Personal conveyances, such as baby strollers, wheel chairs, rolling carts, and the like generally have narrow wheels. Narrow wheels allow such devices to roll more efficiently over hard surface such as concrete, asphalt, wood flooring and the like. Narrow wheels can be a detriment, however; when traveling over soft, loose surfaces such as sand, snow or mud. When such surfaces are encountered, narrow wheels tend to sink into the loose material, making progress over such surfaces difficult if not impossible. This situation can cause many popular places such as sandy beaches, snow covered parking lots, nature trails and others inaccessible to such vehicles.

A solution is needed to make such places more accessible. Preferably a solution will be provided for adapting existing personal conveyances and other vehicles to allow them to travel easily over surfaces on which they presently do not perform well.

SUMMARY OF THE INVENTION

An embodiment of the invention provides a removable tread assembly that is adapted to be installed around the outer circumference of one or more wheels of personal conveyance vehicle such as a baby stroller or a wheel chair. The assembly is formed of a plurality of substantially identical tread links. The tread links include a generally flat tread plate having an upper/outer surface and a lower/inner surface. The upper/outer surface forms a tread surface to engage whatever surface the wheel happens to be rolling over. The tread plates have a width greater than the axial width of the wheel, providing a greater surface area for engaging loose surfaces such as sand or snow. The tread plates have a first end and a second end. A first linking structure is formed adjacent to the first end of the tread plate and a second linking structure formed adjacent the second end of the tread plate, such that the first linking structure of a first tread link is adapted to engage and be secured to the second linking structure of a second tread link. A plurality of substantially identical link fasteners are provided to retractably engage the first and second linking structures of adjacent tread links to secure the adjacent tread links in an articulating manner such that the plurality of tread links may be linked end-to-end in a circuit around the outer circumference of the wheel. The tread links may further include an inner side plate and an outer side plate depending from the lower/inner surface of the tread plate. A portion of the inner and outer side plates may extend beyond the first end of the tread plate. According to an embodiment, the first linking structure includes a first pair of link pin apertures defined by a portion of the inner and outer side plates that extend beyond the first end of the tread plate. The second linking structure includes a second pair of link pin apertures defined by the inner and outer side plates in a recessed area adjacent the second end of the tread plate. According to the embodiment, link pins are inserted into the first and second pairs of link pin apertures of adjacent tread links to secure the tread links together.

Another embodiment relates to a tread link that may be included in a tread assembly for improving the performance of a wheeled vehicle on loose surfaces. According the embodiment a tread link includes a tread plate having first and second surfaces. A first linking structure is associated with a first end of the tread link and a second linking structure is associated with a second end of the tread link. An inner side plate and an outer side plate depend from the second surface of the tread plate and extend between the first and second ends the tread link. The inner and outer side plates are spaced apart a distance sufficient to receive a portion of an outer circumference of a wheel onto which the tread link is to be mounted. A link fastener is provided which is adapted to engage both the first linking structure associated with the first end of the tread link and a second linking structure associated with a second end of a similarly constructed tread link. According to an embodiment, the first linking structure forms a protrusion extending beyond the first end of the tread plate. The second linking structure is formed within a recess defined by the second end of the tread plate. The protrusion is configured to fit into a corresponding recess of the similarly constructed tread link. The inner and outer side plates depending from the second surface of the tread plate line the first and second sides of the protrusion as well as first and second sides of the recess. The inner and outer side plates define a first pair of link pin apertures adjacent the protrusion and a second pair of link pin apertures adjacent the recess. A link fastener including a link pin is insertable into one of the first and second pairs of link pin apertures and the other of a first and second pair of link pin apertures associated with the similarly constructed tread link to secure the tread links together. According to an embodiment, the fastener may be in the form of a U-shaped member having first and second deflectable arms, and a link pin defined by a pair of outwardly facing posts formed on the ends of the first and second arms.

Still another embodiment provides an apparatus for improving a wheel's performance on loose surfaces. The apparatus is formed of a plurality of linked plates. Each linked plate has an upper surface, a lower surface, a first end and a second end, an inner side and an outer side. Preferably, the plates are wider than the axial width of the wheel. A first link structure associated with the first end of the plates, and a second link structure is associated with the second ends of the plates. Link fasteners are provided for securing the first link structures to the second link structures of adjacent plates such that the plates form a linked circuit around the outer circumference of the wheel. A channel is formed on the lower sides of the plates. The channel is configured to receive a portion of the outer circumference of the wheel to prevent the plates form sliding laterally from the wheel. The plates include male link structures extending from the first ends of the plates and female link structures recessed within the second ends of the plates. The plates further including inner and outer side plates depending from the lower surfaces of the plates. The inner and outer side plates line the inner and outer sides of both the male link structures and the female link structures. The channel formed on the lower side of the plates is defined by the inner and outer side plates. The channel is tapered so that the male link structures fit into the female link structures of adjacent plates. Link pin apertures are formed within the inner and outer side plates. First pairs of link pin apertures are formed adjacent the male link structures and second pairs of link pin apertures are formed adjacent the female link structures. The link fasteners comprise link pins inserted through the first set of link pin apertures and the second set of link pin apertures of adjacent plates.

DETAILED DESCRIPTION

Figure 1:
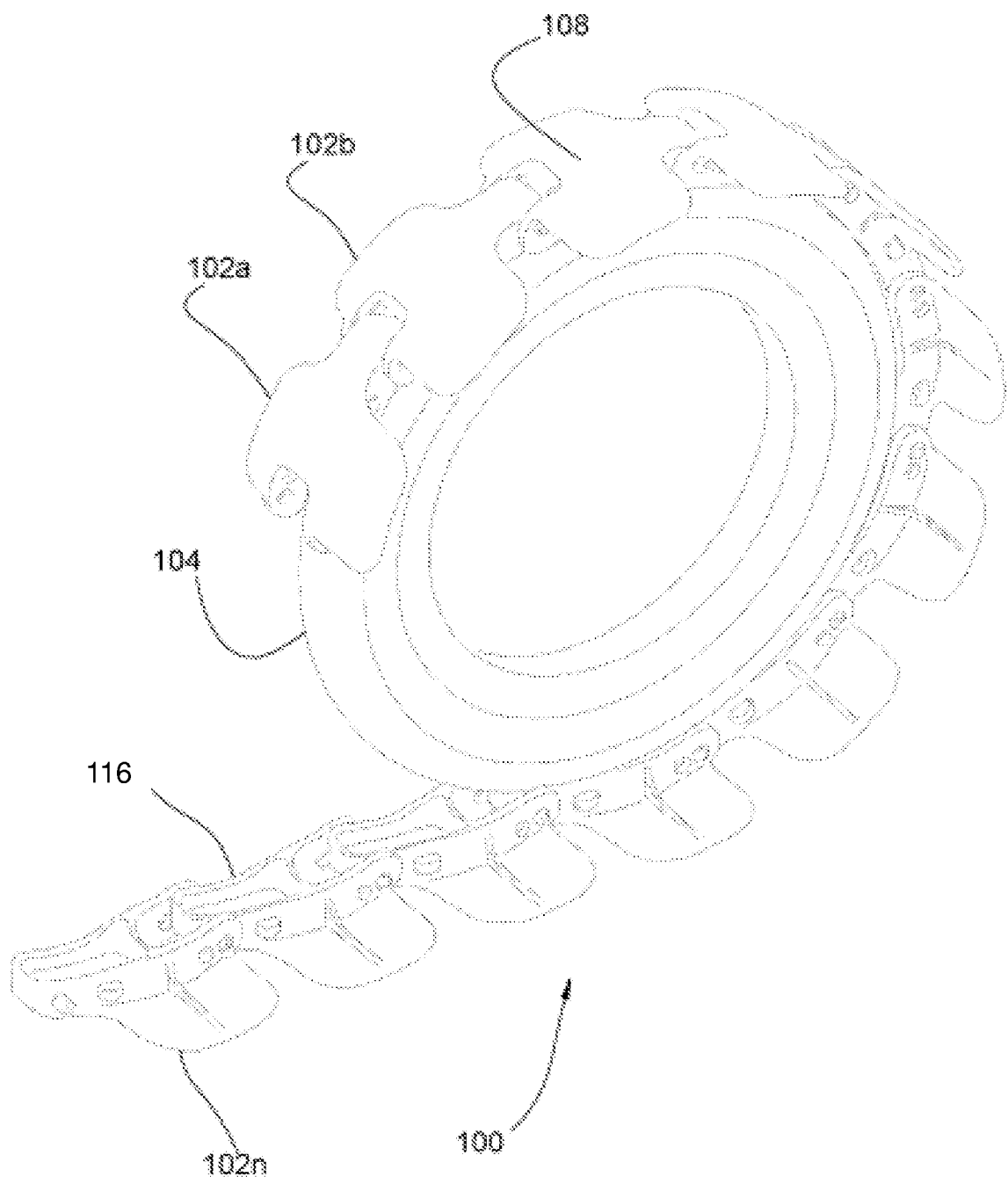
FIG. 1 is a perspective view of a tread assembly according to an embodiment of the invention.

Turning to FIG. 1, the present invention relates to a removable tread assembly 100 adapted to be installed around the outer circumference of a wheel 104 of a personal conveyance vehicle or other manually powered vehicle. The tread assembly 100 is adapted to improve the performance of the wheel 104 when the vehicle operated over loose surfaces such as sand or snow. The removable tread assembly 100 includes a plurality of substantially identical tread links 102. The tread links 102 may be linked together end-to-end in an articulating manner to form a linkage having a length approximately equal to the circumference of the wheel 104 on which the apparatus is to be installed. The last tread link in the assembly 102n may be linked to the first tread link 102a in the same manner as the other tread links to form a linked circuit around the outer circumference of the wheel 104. The tread links 102 include a relatively flat tread plate 108 that is substantially wider than the axial width of the wheel 104. Once installed on the wheel, the tread plates 108 present a significantly wider tread surface for engaging the surface over which the wheel 104 is traveling. The wider tread surface of the tread assembly 100 prevents the wheel from sinking into loose surfaces such as sand, snow or mud as is typically the case with the relatively narrow wheels of most personal conveyance vehicles.

Figure 2:
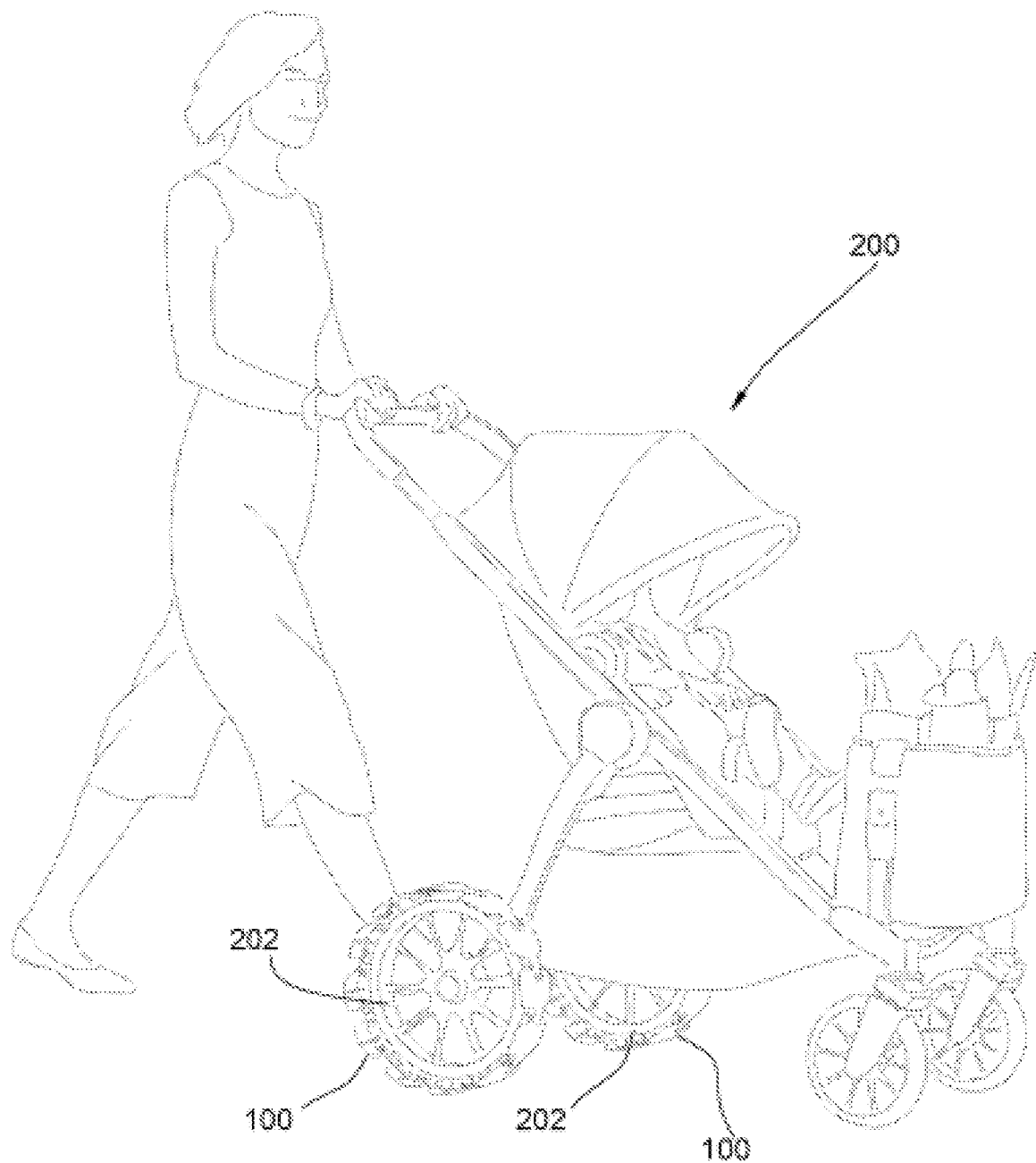
FIG. 2 is an illustration of a tread assembly according to the present invention installed on a baby stroller.
Figure 3:
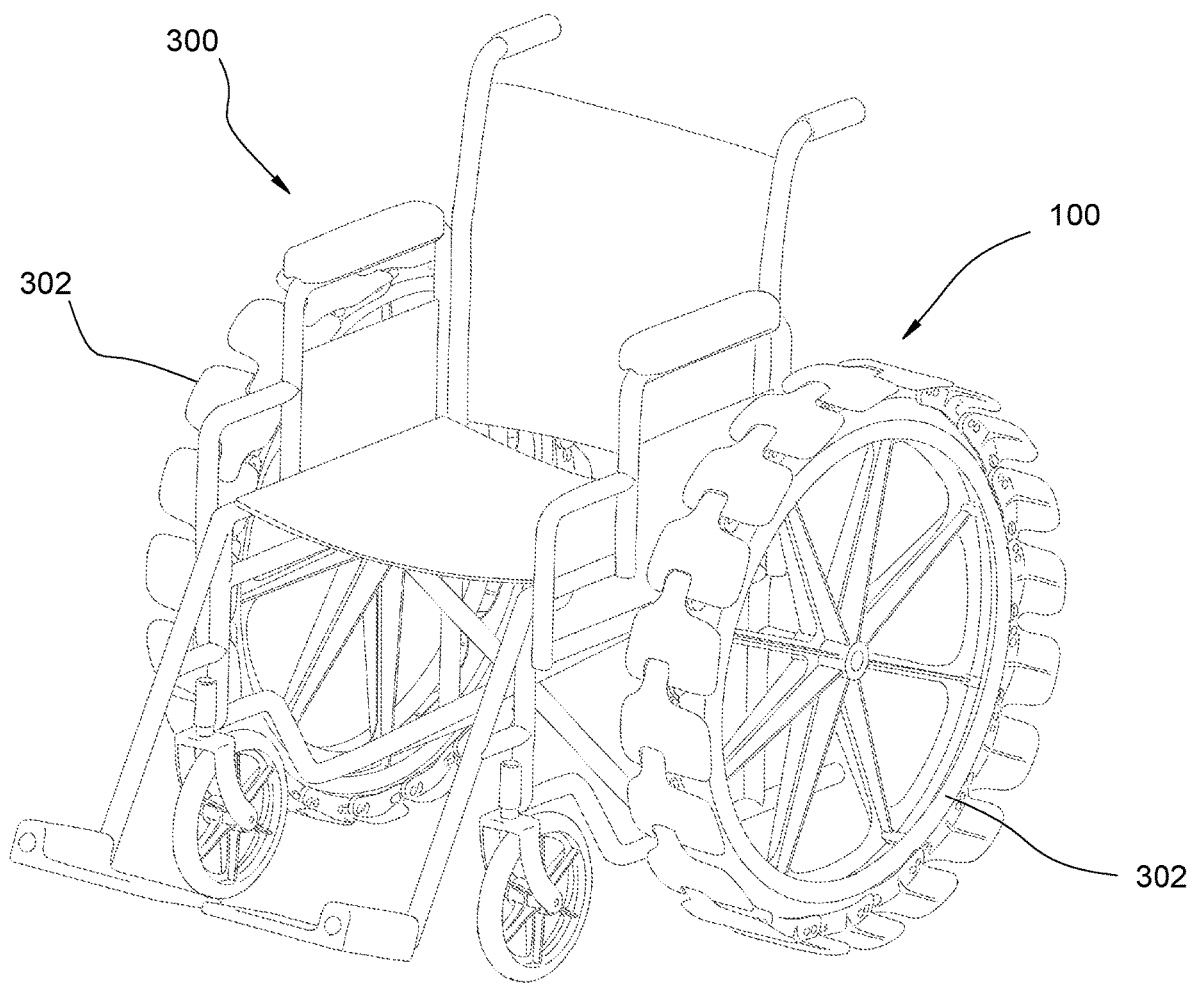
FIG. 3 is an illustration of a tread assembly according to the present invention installed on a wheel chair.
Figure 9:
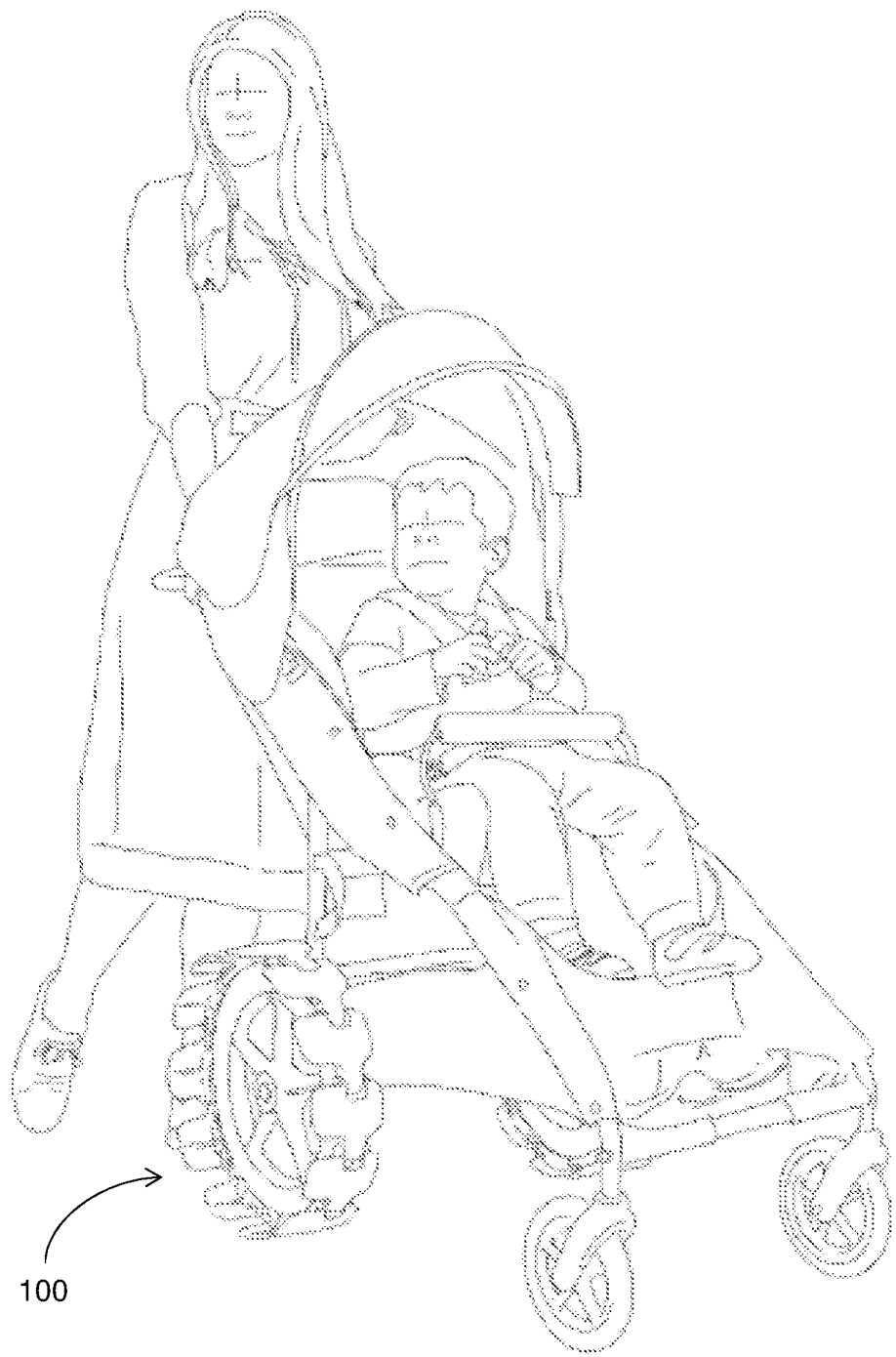
FIG. 9 is an illustration of a tread assembly according to an embodiment of the invention installed on an adaptive stroller or pushchair intended for a larger child or adult with disabilities.

Tread assemblies 100 may be installed, for example, on the rear wheels 202 of a baby stroller 200 as shown in FIG. 2; the drive wheels 302 of a wheel chair 300 as shown in FIG. 3; the rear wheels of an adaptive stroller or pushchair intended for a larger child or adult with disabilities as shown in FIG. 9. Alternatively, tread assemblies 100 may be installed on the wheels of carts or trailers or any other light weight vehicles. Installing a tread assembly 100 to a stroller, wheel chair or other conveyance provides much greater versatility, allowing such conveyances to travel over surfaces such as sand, snow and mud which would ordinarily prove impassible.

Figure 4:
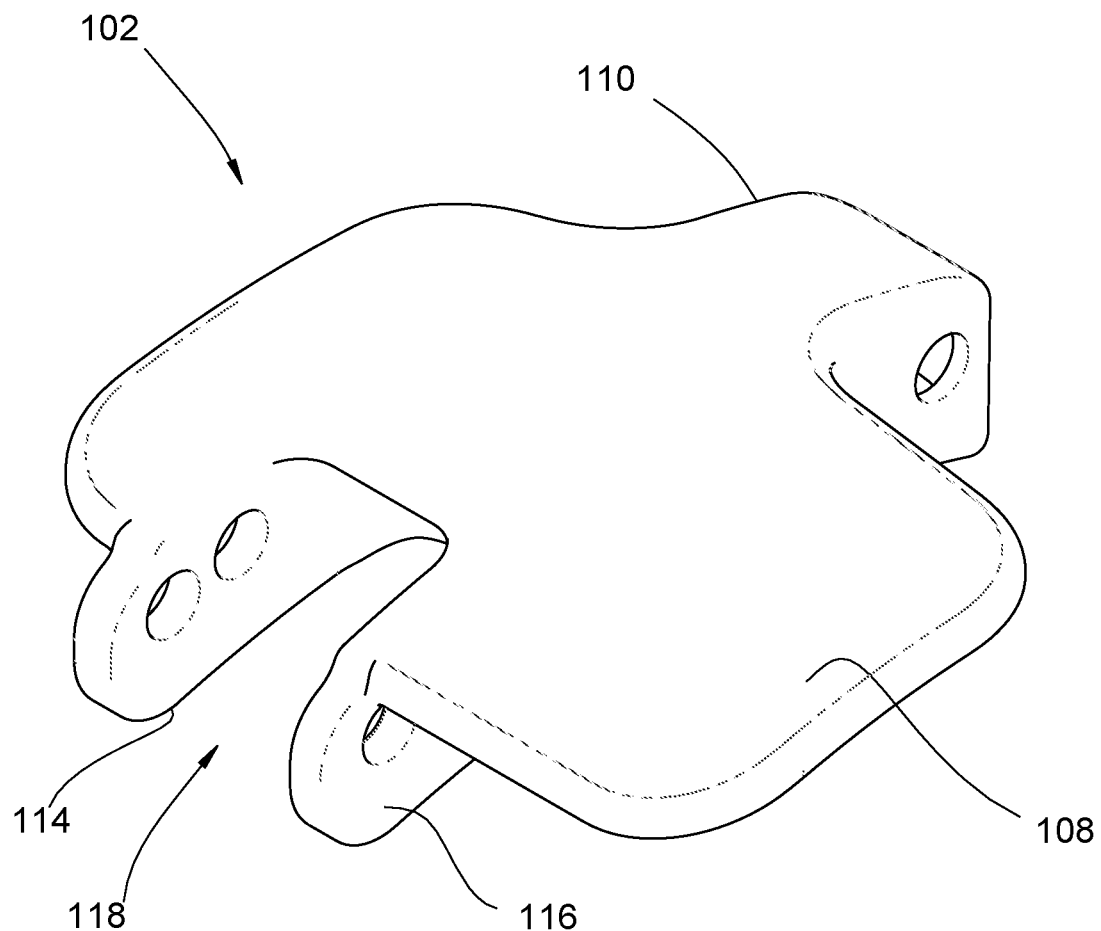
FIG. 4 is a top perspective view of an individual tread link according to an embodiment of the invention.
Figure 5:
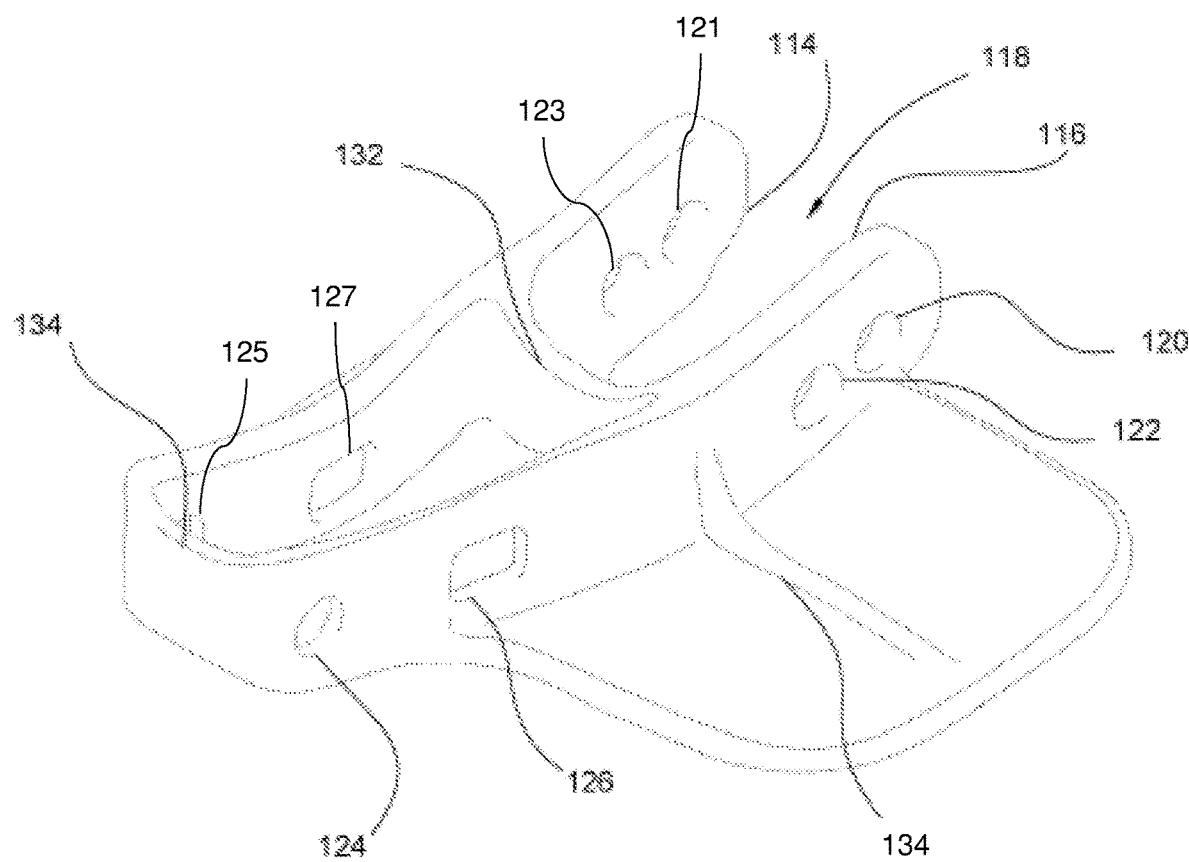
FIG. 5 is a bottom perspective view of the individual tread link of FIG. 4.
Figure 6:
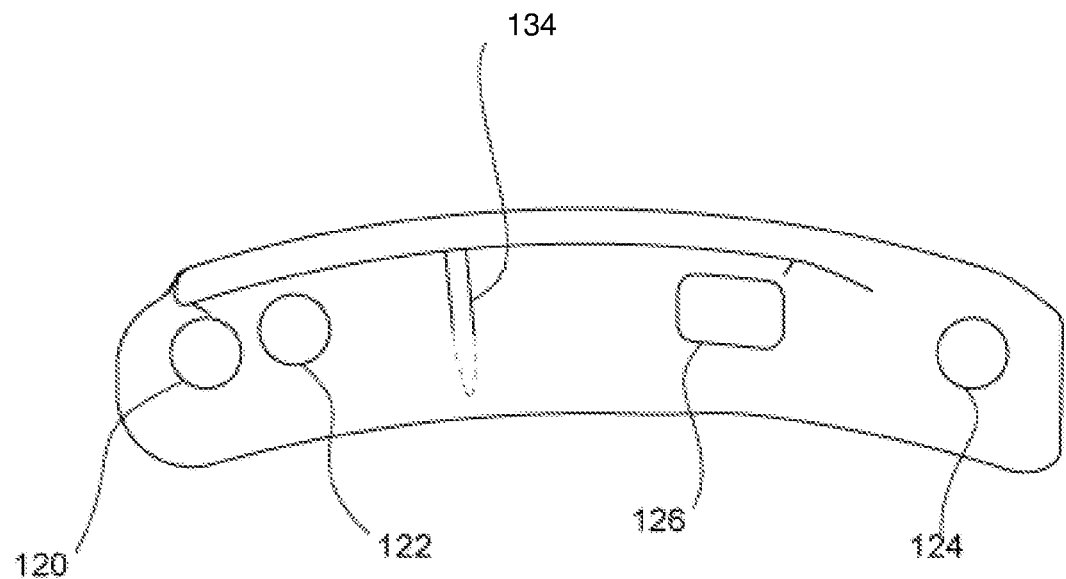
FIG. 6 is a side view of the individual tread link of FIGS. 4 and 5.

An individual tread link 102 will now be described with reference to FIGS. 4, 5 and 6. The tread link 102 comprises a generally rectangular tread plate 108. The tread plate 108 is generally flat from side to side, and slightly from end to end. A first "male" linking structure 110 extends from a first end of the tread plate 108, and a corresponding second "female" linking structure 118 is formed at a second end of the tread plate. The protruding first linking structure 110 of a first tread link 102a is adapted to be inserted into the recessed second linking structure 118 of an adjacent tread link 102 b and secured therein by a link fastener (described later) to form one link within the removable link assembly 100.

An inner side plate 114 and an outer side plate 116 depend from the underside of the tread plate 108. The inner and outer side plates extend the length of the tread plate and line each side of the first linking structure 110 and the recessed sides of the second linking structure 118. The inner and outer side plates 114, 116 converge toward the first end of the tread plate 108 so that the protruding first linking structure 110 will fit into the recessed second linking structure of a similarly constructed adjacent tread link 102. A profile view of the outer sidewall 118 can be seen in the side view of the tread link 102 of FIG. 6. Though not shown, the inner sidewall 114 has a profile similar to but opposite that of the outer sidewall 116 shown in FIG. 6. First, second and third link pin apertures 120, 122, 124 are formed in the outer side plate 118. Similar first, second and third link pin apertures 121, 123, and 125 are formed in the inner side plate 114 directly opposite the first second and third outer side link pin apertures 120, 122, 124 formed in the outer side plate 118. The link pin apertures 121, 123, 125 formed in the inner side wall 114 and the corresponding link pin apertures 120, 122, 124 formed in the outer side wall 116 form cooperating pairs of link pin apertures such that link pins may be inserted through corresponding sets of link pin apertures in each side plate to link adjacent tread plates together as will be described.

The first and second pairs of link pin apertures 120, 121 and 122, 123 formed in the inner and outer side plates 114, 116 are located adjacent the recessed second linking structure 118. The third pair of link apertures 124, 125 formed in the inner and outer side plates 114, 116 are located adjacent the protruding first linking structure 110. A concave transverse support 132 is formed between the inner and outer side plates approximately midway between the first and second ends of the tread link. A similarly shaped transverse end plate 134 is formed across the end of the protruding first linking structure 110. As best seen in FIG. 4, the tread plate 108 extends outwardly from the outer side plate 116 much further than from the inner side plate 114. This is to present as great a surface area as possible to the ground surface when the tread link is installed on a personal conveyance vehicle without interfering with the vehicle itself.

Figure 7:
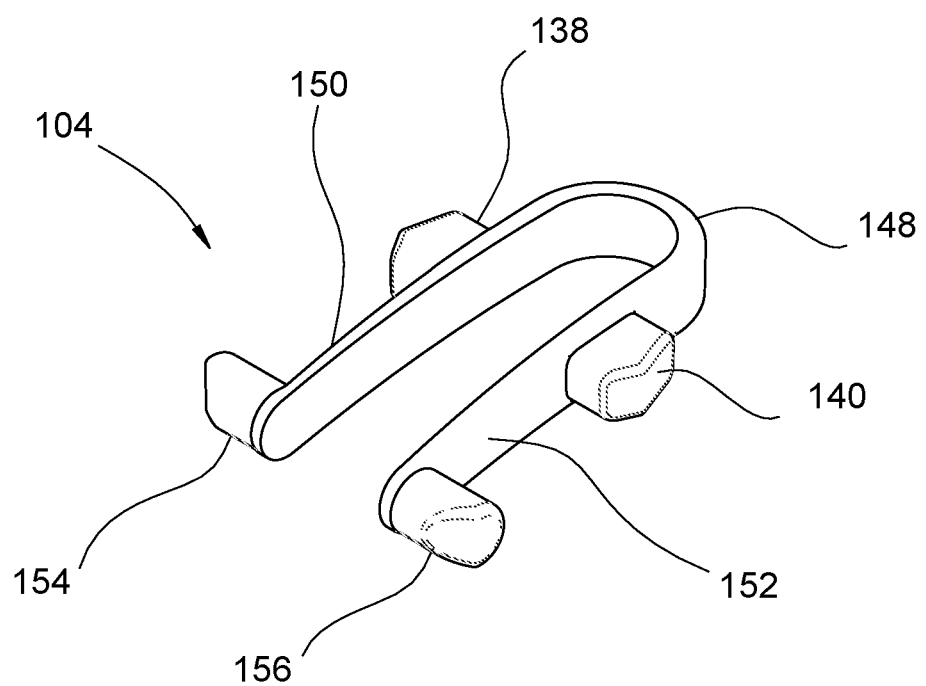
FIG. 7 is a perspective view of a link fastener according to an embodiment of the invention.
Figure 8:
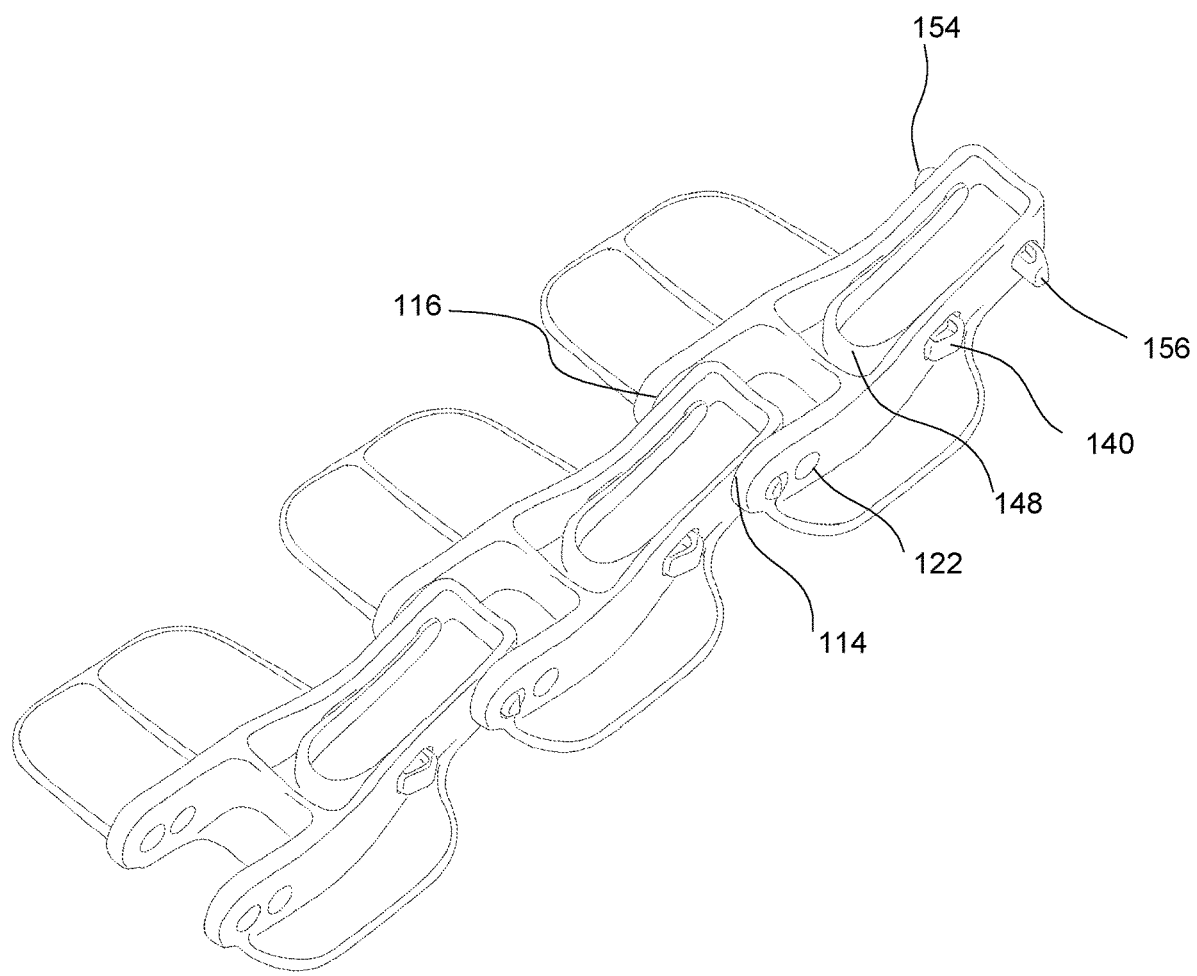
FIG. 8 is a perspective view to two individual tread links linked together according to an embodiment of the invention.

Turning to FIGS. 7 and 8, adjacent tread links 102 may be linked together in a chain like manner. The protruding first linking structure 110 of a first tread link 102a may be inserted into the recessed second linking structure 118 of an adjacent tread link 102b, such that the third pair of link pin apertures 124, 125 formed in the inner and outer side plates 114, 116 of the first tread link 102a adjacent the protruding first linking structure 110 aligns with the either first or second pair of link pin receiving apertures 120, 121 or 122, 123 formed in the inner and outer side plates 114, 116 adjacent the recessed second linking structure of the second tread link 102b. The first and second sets of link pin receiving apertures 120, 121 and 122, 123 are provided so that the overall length of the tread assembly 100 may be adjusted depending on whether the third pair of link pin apertures 124, 125 of the first tread link 102a is aligned with the first or second set of link pin apertures 120, 121 or 122, 123 of the second tread link 102b.

Once the first and second tread links are properly aligned, they may be secured to one another by the link fastener 104. The link fastener 104 is a U-shaped member 148 having first and second inwardly deflecting arms 150, 152. The first and second arms 150, 152 may be deflected inwardly by simultaneously squeezing release tabs 138, 140 formed on the outer sides of each arm 150, 152. The tread links 102 and the U-shaped member may be made of rubber, nylon ABS (acrylonitrile butadiene styrene) or ASA (acrylonitrile styrene acrylate) or other similar material. The arms of the U-shaped member 150, 152 have a spring-like quality when deflected inward, such that they tend to return to their neutral state when released. Link pins 154, 156 protrude outwardly from the ends of each arm 150, 152. When the third pair of link pin apertures 124, 125 of the first tread link 102a is aligned with either the first or second pair of link pin apertures 120, 121 or 122, 123 of the second tread link 102b, the first and second arms of the U-shaped member 148 may be deflected inward and the U-shaped member inserted into the space formed between the inner and outer side plates 114, 116 of the first tread link 102a. The link pins 154, 156 may then be aligned with the aligned link pin apertures of the first and second tread links 102a, 102b, and the release tabs 138, 140 aligned with the release tab receiving holes 126, 127 formed in the inner and outer side plates 114, 116 of the first tread link 102a. So aligned, the arms 150, 152 of the U-shaped may be released. Once released, the deflected arms of the U-shaped member will tend to spring outward toward their neutral, un-deflected position, forcing the locking pins 154, 156 into the aligned link pin receiving apertures of the first and second tread links 102a, 102b. The width of the U-shaped member may be selected such that the width of the space between the inner and outer side plates of the tread links is somewhat narrower than the un-deflected neutral position of the two arms 150, 152. With this arrangement the arms of the U-shaped member will remain continuously biased against the inner and outer side plates 114, 116, securing the link pins 154, 156 within the link pin apertures of the first and second tread links 102a, 102b, thereby securing the first and second tread links 102a, 102b together.

When the link fastener 104 is properly seated between the inner and outer side plates 114, 116 of the first tread link 102a, the release tabs 138, 140 formed on the arms 150, 152 of the U-shaped member 148 extend through the release tab receiving holes 126, 127 formed in the inner and outer side plates of the first tread link 102a. The release tabs 138, 140 may be manually pressed inward to withdraw the link pins 154, 156 from the link pin apertures 120, 121 or 122, 123 of the second tread link 102b and the link pin receiving holds 124, 125 of the first tread link 102a to remove the link fastener 104 and decouple the first and second tread links 102a, 102b.

In use, a plurality of tread links 102a, 102b, . . . , 102n are linked together as described. The particular number of tread links corresponding to the circumference the wheel on which the apparatus is to be installed. When the tread assembly is assembled, it may be wrapped around the outer circumference of a wheel 106 as shown in FIG. 1. The first and last tread links 102a, 102n, may then be joined and the assembly secured to the wheel 106 using a last U-shaped member as described. As best seen in FIG. 5, the first and second transverse supports 132, 134 have a convex arcuate shape corresponding to the transverse shape of the wheel or tire around which the apparatus is to be installed. The transverse supports 132, 134 and the inner and outer side plates 114, 116 of the tread links 102 form a channel for receiving the outer circumference of the wheel. The channel prevents the apparatus from sliding laterally off the sides of the wheel.

When installed on a wheel, the tread plates 108 combine to create a much wider surface for contacting ground. The wider surface prevents the wheel from sinking into loose surfaces such as sand, mud or snow. The wider surface allows personal conveyances such as baby strollers, wheel chairs and the like, as well as carts or other rolling devices to be far more versatile and make many places such as beaches and snow covered parking lots far more accessible.

Various embodiments of the invention have been described and illustrated; however, the description and illustrations are by way of example only. Other embodiments and implementations are possible within the scope of the invention and will be apparent to those of ordinary skill in the art. Therefore, the invention is not limited to the specific details of the representative embodiments and illustrated examples in this description. Accordingly, the invention is not to be restricted except as necessitated by the accompanying claims and their equivalents.

What is claimed is:

1. A removable tread assembly adapted to be installed around an outer circumference of a wheel of a manually powered vehicle, the assembly comprising:
a plurality of substantially identical tread links, the tread links including a tread plate having a first surface and a second surface, a first end and a second end, and the tread plate having a width greater than an axial width of the wheel, the tread links further including a first linking structure adjacent the first end of the tread plate and a second linking structure adjacent the second end of the tread plate, wherein the first linking structure of the tread link is adapted to engage and be secured to the second linking structure of another tread link; and
a plurality of substantially identical link fasteners adapted to retractably engage the first and second linking structures of adjacent tread links to secure the adjacent tread links in an articulable manner such that the plurality of tread links may be linked end-to-end in a circuit around the outer circumference of the wheel;
wherein the tread links further comprise inner and outer side plates depending from the second surface of the tread plate, the inner and outer side plates defining a channel therebetween extending between the first and second ends of the tread plates, and
wherein a portion of the inner and outer side plates extends beyond the first end of the tread plate, and wherein the inner and outer side plates line a recess formed in the second end of the tread plate, the inner and outer side plates being spaced apart from one another in a tapered manner such that the portions of the inner and outer side plates extending beyond the first end of the tread plate of the first tread link may be inserted into the recess formed in the second end of a second tread plate.

2. The removable tread assembly of claim 1 wherein the manually operated vehicle is one of a baby stroller, baby carriage, a wheel chair, an adaptive stroller; an adaptive pushchair; and a cart.

3. The removable tread assembly of claim 1 wherein the first linking structure comprises a first pair link pin apertures defined by the portions of the inner and outer side plates that extend beyond the first end of the tread plate and the second linking structure comprises a second pair of link pin apertures defined by the portions of the inner and outer side plates lining the recess formed in the second end of the tread plate.

4. The removable tread link assembly of claim 3 wherein the link fasteners comprise a plurality of U-shaped members having first and second deflectable arms having link pins extending outwardly from the ends thereof, the link pins configured to be inserted through the first and second pairs of link pin apertures of adjacent tread links to secure the adjacent tread links in an articulating manner.

5. A tread link for use in a tread assembly comprising a plurality of linked tread links, the tread link comprising:
a tread plate having first and second surfaces;
a first linking structure associated with a first end of the tread link and a second linking structure associated with a second end of the tread link, wherein the first linking structure comprises a protrusion extending beyond the first end of the tread plate, and the second linking structure comprises a recess defined by the second end of the tread plate, the protrusion configured to fit into a corresponding recess of another tread link;
an inner side plate and an outer side plate depending from the second surface of the tread plate and extending between the first and second ends the tread link, the first and second side plates spaced apart an amount sufficient to receive a portion of an outer circumference of a wheel onto which the tread link is to be mounted;
a link fastener adapted to engage the first linking structure associated with the first end of the tread link and a second linking structure associated with a second end of the other tread link;
inner and outer side plates depending from the second surface of the tread plate and lining first and second sides of the protrusion as well as first and second sides of the recess, the inner and outer side plates defining a first pair of link pin apertures adjacent the protrusion and a second pair of link pin apertures adjacent the recess; and
a link fastener including a link pin insertable into one of the first and second pairs of link pin apertures and the other of a first and second pair of link pin apertures associated with the other tread link, wherein the fastener comprises a U-shaped member having first and second deflectable arms, the link pin defined by a pair of outwardly facing posts formed on the ends of the first and second arms.

6. An apparatus for improving a wheel's performance on loose surfaces, the apparatus comprising:
a plurality of linked plates, the plates having an upper surface, a lower surface, a first end and a second end, an inner side and an outer side, the plates having a width greater than an axial width of the wheel;
first link structures associated with the first ends of the plates, and second link structures associated with the second ends of the plates;
link fasteners for securing the first link structures to the second link structures of adjacent plates such that the plates form a linked circuit around an outer circumference of the wheel; and
a channel associated with the lower sides of the plates, the channel configured to receive a portion of the outer circumference of the wheel, preventing the plates from sliding laterally from the wheel,
wherein the plates include male link structures extending from the first ends of the plates and female link structures recessed within the second ends of the plates, the plates further including inner and outer side plates depending from the lower surfaces of the plates, the inner and outer side plates lining inner and outer sides of the male link structures and the female link structures, the inner and outer side plates defining the channel, the channel being tapered such that the male link structures fit into the female link structures of adjacent plates, the inner and outer side plates defining first sets of link pin apertures adjacent the male link structures and second pairs of link pin apertures adjacent the female link structures, and wherein the link fasteners comprise link pins inserted through the first set of link pin apertures and the second set of link pin apertures of adjacent plates.

7. The apparatus of claim 6 wherein the fasteners comprise U-shaped members having first and second deflecting arms, and first and second link pins extending from the first and second arms.

8. The apparatus of claim 7 wherein the U-shaped members further include first and second release tabs formed on outer surfaces of the first and second arms, respectively, and wherein the inner and outer side plates define release tab apertures, the first and second release tabs extending through the release tab apertures when the first and second link pins are inserted into the first and second sets of link pin apertures of adjacent plates.

9. The apparatus of claim 6 further comprising an arcuate transverse support within the channel configured to axially engage an outer surface of the wheel.

10. The apparatus of claim 6 wherein the first and second link structures comprise mating hinge knuckles formed on the first and second ends of the plates.

11. The apparatus of claim 10 wherein the fasteners comprise hinge pins adapted to be inserted through the mating hinge knuckles associated with adjacent plates.

* * * * *